US011531974B2

(12) United States Patent
Bordash et al.

(10) Patent No.: US 11,531,974 B2
(45) Date of Patent: Dec. 20, 2022

(54) TRACKING TRANSACTIONS THROUGH A BLOCKCHAIN

(71) Applicant: International Business Machines Corporation, Armonk, NY (US)

(72) Inventors: Michael J. Bordash, Newtown, CT (US); Michael J. Hudson, Delray Beach, FL (US); Chih-Hong Wong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 15/239,639

(22) Filed: Aug. 17, 2016

(65) Prior Publication Data

US 2018/0053161 A1 Feb. 22, 2018

(51) Int. Cl.
*G06Q 20/10* (2012.01)
*G06Q 20/36* (2012.01)
*G06Q 20/38* (2012.01)

(52) U.S. Cl.
CPC ....... *G06Q 20/102* (2013.01); *G06Q 20/3676* (2013.01); *G06Q 20/382* (2013.01); *G06Q 20/387* (2013.01); *G06Q 20/389* (2013.01); *G06Q 2220/00* (2013.01)

(58) Field of Classification Search
CPC ............. G06Q 20/102; G06Q 20/3676; G06Q 20/00–425
See application file for complete search history.

(56) References Cited

U.S. PATENT DOCUMENTS

| 2010/0106568 | A1* | 4/2010 | Grimes | G06Q 30/02 705/14.1 |
|---|---|---|---|---|
| 2014/0122272 | A1 | 5/2014 | Arzumanyan et al. | |
| 2015/0228004 | A1 | 8/2015 | Bednarek et al. | |
| 2015/0348173 | A1 | 12/2015 | Gillen | |
| 2016/0012424 | A1* | 1/2016 | Simon | G06Q 20/3674 705/67 |
| 2016/0092880 | A1* | 3/2016 | Klingen | G06Q 20/42 705/16 |
| 2016/0092902 | A1* | 3/2016 | Storry | G06Q 30/0225 705/14.26 |
| 2016/0098689 | A1 | 4/2016 | Bowles et al. | |
| 2016/0098723 | A1* | 4/2016 | Feeney | G06Q 20/065 705/75 |
| 2016/0323109 | A1* | 11/2016 | McCoy | G06Q 50/184 |

(Continued)

OTHER PUBLICATIONS

Ron White, How Computers Work, Oct. 15, 2003, Que Publishing, 7th Ed, p. 4. (Year: 2003).*

(Continued)

*Primary Examiner* — Mohammad A. Nilforoush (57) ABSTRACT

A security application may provide a secure digital currency for a blockchain while maintaining anonymity and security from unauthorized third parties. One example may include one of accessing a retailer site from a device, selecting one or more items for purchase, transmitting a payment option to the retailer site for the selected one or more items, receiving a payment request message from the retailer site comprising a unique identifier linked to one or more incentives, creating a payment confirmation message comprising the unique identifier and the one or more incentives, and transmitting the payment confirmation.

14 Claims, 4 Drawing Sheets

(56) References Cited

U.S. PATENT DOCUMENTS

2017/0324711 A1* 11/2017 Feeney ................ H04L 9/3247
2018/0227293 A1* 8/2018 Uhr ....................... G06Q 20/36

OTHER PUBLICATIONS

IBM. (2006). Method and System for Gaining Consumer Information Proximate to Point-of-Sale. ip.com Prior Art DTD. IPCOM000141608D. See the highlighted sections.

IBM. (2006). Anonymous Customer Profiling and Offer Generation. ip.com Prior Art DTD. IPCOM000139934D.

* cited by examiner

TRACKING TRANSACTIONS THROUGH A BLOCKCHAIN

TECHNICAL FIELD

This application relates to secure transactions and more particularly to tracking transactions through a blockchain.

BACKGROUND

Security is a priority when transactions are being conducted over a network. In general, digital crypto-currencies are exchanged using transactions designed to be anonymous. A blockchain address is a digital identity that could be used to supplant the use of commonly associated identifiers used in online and digital financial transactions. The impact to marketing programs is significant as it is difficult to link such transactions to an identity making efforts to retain customers for subsequent transactions difficult. An individual can be associated with a unique address each time they perform a transaction. Without a static user identifier, such as an email address or phone number, marketing efforts will not be able to link a customer's transactions and thus become less optimal.

SUMMARY

Example embodiments provide a method that includes at least one of accessing a retailer site from a mobile device or eCommerce store, selecting one or more items for purchase, transmitting a payment option to the retailer site for the selected one or more items, receiving a payment request message from the retailer site comprising a unique identifier, and creating a payment confirmation message comprising the unique identifier, and transmitting the payment confirmation.

Another example embodiment may include an apparatus having at least one of a processor configured to access a retailer site from a mobile device, select one or more items for purchase, and a transmitter configured to transmit a payment option to the retailer site for the selected one or more items. A receiver is configured to receive a payment request message from the retailer site comprising a unique identifier, and the processor also creates a payment confirmation message comprising the unique identifier, and the transmitter transmits the payment confirmation.

Another example embodiment may include a non-transitory computer readable storage medium configured to store instructions that when executed cause a processor to perform at least one of accessing a retailer site from a mobile device or eCommerce store, selecting one or more items for purchase, transmitting a payment option to the retailer site for the selected one or more items, receiving a payment request message from the retailer site comprising a unique identifier, creating a payment confirmation message comprising the unique identifier, and transmitting the payment confirmation.

Another example embodiment may include a method that includes at least one of accessing a retailer site from a device, selecting one or more items for purchase, transmitting a payment option to the retailer site for the selected one or more items, receiving a payment request message from the retailer site comprising a unique identifier linked to one or more incentives, creating a payment confirmation message comprising the unique identifier and the one or more incentives, and transmitting the payment confirmation.

Another example embodiment may include an apparatus that includes at least one of a processor configured to access a retailer site from a device, select one or more items for purchase, a transmitter configured to transmit a payment option to the retailer site for the selected one or more items, and a receiver configured to receive a payment request message from the retailer site comprising a unique identifier linked to one or more incentives, and the processor is also configured to create a payment confirmation message comprising the unique identifier and the one or more incentives, and the transmitter is configured to transmit the payment confirmation.

Still yet a further example embodiment may include a non-transitory computer readable storage medium configured to store instructions that when executed causes a processor to perform accessing a retailer site from a device, selecting one or more items for purchase, transmitting a payment option to the retailer site for the selected one or more items, receiving a payment request message from the retailer site comprising a unique identifier linked to one or more incentives, creating a payment confirmation message comprising the unique identifier and the one or more incentives, and transmitting the payment confirmation.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software program which provides an operation to link blockchain addresses/data with other collected data (such as channel data associated with a customer, transaction, location, product, service, etc.). The operation also provides an incentive for customers to use the application and/or software program through opt-in data sharing with a commerce retailer or service provider that is seeking to engage in anonymous transactions. For example, by offering incentives that could only be certified if additional data is included in the transaction, such as an email address, coupon identifier (ID), offer ID, or other code, such metadata would enable linking of the customer's blockchain address with other data in a device or platform, such as a customer relationship management (CRM) system. One approach according to example embodiments includes utilizing a BITCOIN 'OP_RETURN' script operator, which can be used to mark a transaction output as invalid. Since the data after OP_RETURN script operator is commonly irrelevant to a BITCOIN payment/transaction, this enables arbitrary data to be added into the output after an OP_RETURN script operator or an OP_RETURN code.

Figure 1:
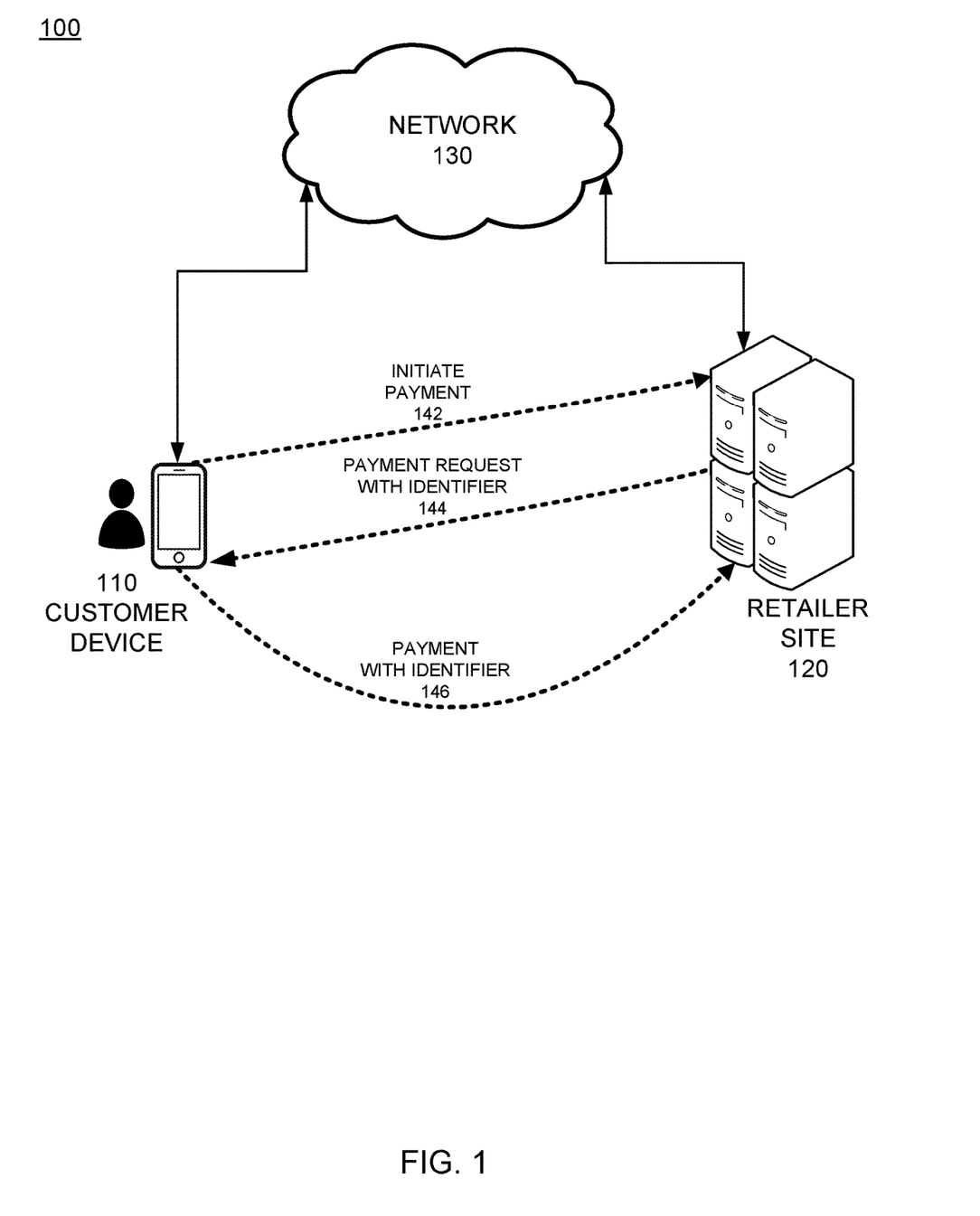
FIG. 1 illustrates an example communication network and a purchase action according to an example embodiment.

FIG. 1 illustrates an example communication network and a purchase action according to an example embodiment. Referring to FIG. 1, a network 100 includes a network 130 (which comprises one or more computers or servers and may be cloud based) which is responsible for hosting communications between a customer device 110 and certain remote entities, such as a retailer site 120. In operation the customer device 110 may be used to browse a retailer's or a service provider's website for products, merchandise and/or services and initiate a purchase for one or more of those items. In other embodiments, the customer device 110 may be used to browse a retailer's or a service provider's application or app on the customer device 110 for products, merchandise and/or services and initiate a purchase for one or more of those items. Once the items are selected and a user profile is established with respect to the device 110 and the items selected, a price or summary of the items for purchase may be used as a basis to provide the customer device 110 with a total price for products to be purchased as well as, optionally, other related item, delivery, etc. data.

After the items of interest are selected, and placed in a checkout area, in an embodiment, the customer may initiate a purchase payment transaction by selecting any of a plurality of payment options. One of the purchase options may be a crypto-currency such as BITCOIN which utilizes a blockchain for security. In this example, the payment 142 may be sent as a blockchain initiated payment. The payment 142 may be received and processed to include an assigned identifier, a user profile or any information associated with a blockchain security environment. The retailer site 120 may then create a request for funds with an assigned transaction identifier (ID) 144, which is used throughout the transaction to associate the purchase with the ID for security and tracking purposes. The request message and ID may include an incentive, such as a rebate, coupon, advertisement, and metadata that stores the information for tracking purposes. The request is sent to the customer device 110, which may respond with a response 146 that includes the same ID in a positive affirmation of the purchase and acceptance of the transaction and/or the incentive.

The approach in FIG. 1 is an operation or procedure, which can be used by retailers to track customer activity across various interaction channels, including channels that leverage the blockchain for payment transactions. The retailer 120 may initiate the payment transaction with a payment request (invoice) and embed the ID within the payment request. The customer device 110 may respond to the payment request with a new transaction, and in doing so may embed the same ID within the new transaction either by responding to the request or by selecting the incentive offer which creates a response message with the same ID embedded in the response message. The incentive for the customer to re-transmit the identifier is that the identifier represents a discount coupon or offer. When the retailer receives payment a further transaction is generated to refund the customer the agreed discount amount as specified by the coupon or offer in the form of a rebate or other consideration.

A related identifier may be embedded in the refund (rebate) transaction. The retailer maintains a database linking this identifier to known customer information. Since the identifiers are maintained and stored permanently on the blockchain, the retailer 120 or its affiliates can mine the data for customer analysis and segmentation at a future date. The identity data is visible but not intelligible to an unauthorized third party. The identity data ID could also include additional encoded key/value pairs that further define the user or the transaction, for example as a metadata package. The identity of the customer can be inferred from the incentive/coupon/cookie. However, the specific data in the incentive/coupon/cookie will only be understood by the retailer and, optionally, their trusted agents thus preserving identity security.

Figure 2:
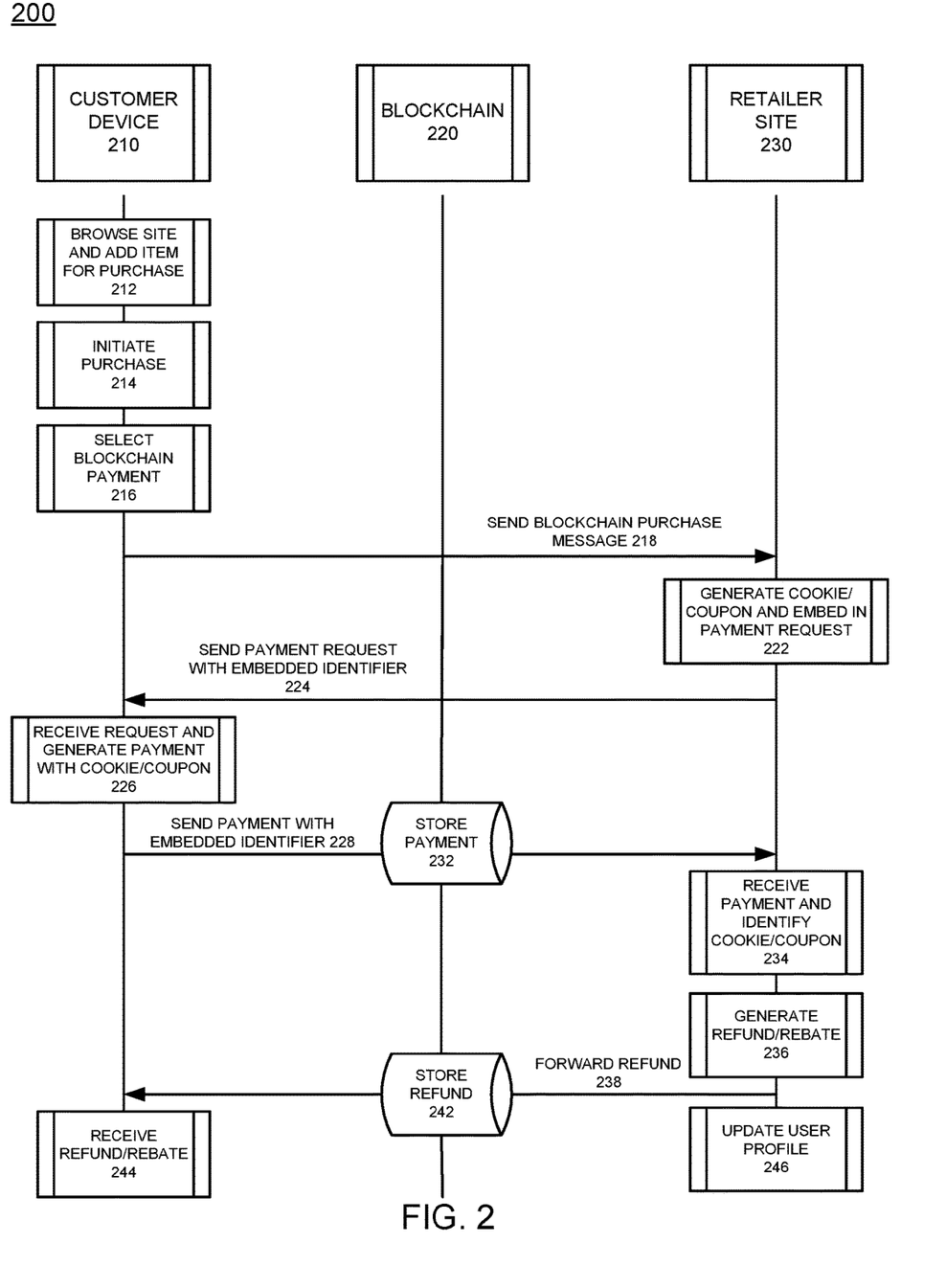
FIG. 2 illustrates a system signaling diagram of various processes and communication operations during an attempted purchase and security procedure according to an example embodiment.

FIG. 2 illustrates a system signaling diagram of various processes and communication operations during an attempted purchase and security procedure according to an example embodiment. Referring to FIG. 2, the system diagram 200 includes details of a customer device purchase and related security information. In operation, the customer device 210 browses the retailer's store using a web browser or application of a computing device or mobile device. The customer adds items to the shopping cart or other selection interface 212. As the items for purchase are selected, or after they are selected, the customer device 210 initiates a checkout procedure and initiates a purchase 214. In this scenario, the customer device 210 is used to select a blockchain based payment process 216, such as BITCOIN or any secure money purchase function. The payment message 218 may be sent to the retailer site 230 which is stored on a computer, network, platform, etc. The retailer site 230 may then generate an identifier which may be linked to an incentive such as a coupon or offer and which may be stored in the metadata of, or a different portion of, a blockchain communication message. The coupon or other message type may be a cookie and may be embedded in the request message 222. The generated message may be sent back to the customer device 210 as a request 224 with an embedded identifier.

The retailer site 230 may generate a payment request transaction and embed the identifier in a message such as a transaction script operation or an open portion of the script. The retailer site 230 may transmit the payment request transaction to the customer device 210 based on a blockchain security configuration 220 which may be stored on the customer device 210, the retailer site 230 or a server (not shown) that is communicably coupled to the device 210 and/or the site 230. The customer device 210 may receive the payment request and generate another message that embeds the same identifier for reference purposes 226. The payment confirmation 228 may then be sent to the retailer 230 as a new message that is stored in the blockchain information source 232. The retailer 230 will receive and process the user device generated message and identify the cookie/coupon 234 as assigned to the user device 210. The script of the message request may include a coin wallet/exchange/gateway that defaults to return identifiers or prompt the user of the device to select whether to return the assigned identifiers.

The retailer site 230 will confirm the ID and issue the incentive to the user profile account 236 if there is a valid identifier in the payment transaction and the offer includes a refund (rebate). The retailer 230 will generate a new identifier with a new coupon or offer which may be void, or alternatively, apply the refund at a later date for a subsequent transaction based on the record. The retailer 230 may also generate a payment refund transaction and embed the identifier in the transaction script which can be logged as part of the blockchain data 242. The retailer transmits 238 the payment refund transaction to the blockchain network 242. At some point, the customer device 210 receives the refund transaction, credit or subsequent incentive 244.

If the refund/credit is redeemable immediately then a new transaction will be created. The retailer may elect to include identifying information in the new transaction in the form of an OP_RETURN script or they may choose not to include such an incentive. They may or may not also select to put a record of the refund/credit in the user's profile 246. If the refund/credit is not redeemable immediately then it will be applied to the user's account in the form of a record assigned to or associated with the user profile.

The payment request, otherwise known as an invoice, can be processed outside of the blockchain. This may be a simple message informing the customer to pay a specified amount to a specified address. In BITCOIN, this may be a QR code generated during the checkout procedure of the e-commerce transaction by the retailer, which states "send this many coins to this address and dedicate this many satoshis to cover transaction fees". A satoshi is the smallest fraction of a BITCOIN that can currently be sent: 0.00000001 BTC, that is, a hundredth of a millionth BTC. In the future, however, the protocol may be updated to allow further subdivisions. The QR code is scanned by the customer on the customer device and triggers the wallet application to create a new transaction. The transaction is created to "send this many coins to this address FROM an address associated with this wallet and dedicate this many satoshis to cover transaction fees". The invoice can further be modified to state "send this many coins to this address, dedicate this many satoshis to cover transaction fees and put this cookie/coupon or offer into the script_op". The transaction is then created to "send this many coins to this address FROM an address associated with this wallet, dedicate this many satoshis to cover transaction fees and put this cookie/coupon or offer into the script_op".

The invoice could be communicated using various different communication procedures or protocols, however the information in the invoice should include the identifier/coupon or offer ID. The customer is free to ignore the request to put the identifier/coupon or offer in the OP_RETURN script operator or 'script_op' via the customer device 210, however, in doing so the customer rejects the offer of a refund. In alternate embodiments, the customer device 210 can automatically accept such a request by placing, via an application running on the device, the identifier/coupon or offer in the OP_RETURN script operator when it is received. The payment transaction and the refund transaction are recorded on the blockchain, and the identifiers in the OP_RETURN script operator or 'script_op' are visible to everyone although the actual data will be encrypted. Since the retailer has information about the customer via internal identifier matching, the retailer can track customer activity across the blockchain. For example, if data that identifies the customer is used to generate the identities, and the identity generation and encryption method is known to the retailer and potentially the retailer associates, the blockchain can be mined to build a life-long profile of the customer over many different transactions.

The distributed shared ledger of blockchain enables provenance for all participants across the entire transaction history. Payments based blockchains (such as BITCOIN) provide visibility to every field in every transaction, however some of the fields are encrypted so that they only can only be understood by people who have an ability to unencrypt and parse or read them. The OP_RETURN field is visible, but since it contains freeform data, applications may select whether that data is public or not. In the example embodiments, that data is encrypted and anyone with the decryption key (i.e., the retailer and its authorized associates) will be able to understand the data as the incentive/coupon/cookie. If someone possessed the key to decrypt the data, and has access to the system of record (i.e., the customer profile) to look up the incentive/coupon/cookie, they can identify the identity of who participated in that transaction.

In one example, data may be retrieved to identify a trend or known customer attribute(s). For example, a record of user profile transactions may yield "In June 2015 this customer bought one of these items [[x]] from this store [[y]], and in October 2016 the customer also bought two of [[z]] from that same store [[y]]." According to example, embodiments, the 'blockchain' may include timestamped batches of valid transactions. Each block of transactions may include the hash of the prior block which links the blocks together. The linked blocks form a chain, with each additional block reinforcing those which proceed the current block. The blockchain may also be referred to as a digital ledger that records every transaction that is known to have occurred, and which is protected by cryptography. Additionally, the blockchain resides not in a single server, but across a distributed network of computers. Accordingly, whenever a new transaction occurs, the blockchain may be authenticated across this distributed network, and the transaction is included as a new "block" on the chain of existing blocks.

The OP_RETURN script operator or script_op may store metadata as part of a blockchain transaction. This portion of the output scripts of the blockchain may be a blank space that permits applications to attach any data desired to the transaction. The incentive/coupon/cookie is stored in the OP_RETURN script operator. The transaction template is created by the retailer by populating fields in the transaction (i.e., receiver address, amount, etc.) in the OP_RETURN field. The incentive/coupon/cookie is placed in the OP_RETURN field. The transaction data is then sent to the customer who completes the sender address by, for example, passing on all of the other fields that the retailer has completed. The customer device 210 submits the fully completed transaction to the blockchain payment network where it is processed, mined and ultimately preserved in a block on the chain.

In operation, the customer device must be running a blockchain client, for example, a BITCOIN wallet running on the customer's device 210. The client completes the fields in the transaction, however, some of the fields can be pre-populated by the retailer in the form of a payment request (i.e., the OP_RETURN field). Once the client has generated a formed transaction it uses its built in peer-to-peer network connection to broadcast the transaction to all of its peers. Those peers, in turn, broadcast it to all their peers and begin the mining process. Eventually one peer will successfully mine the transaction into a block, add it to its copy of the blockchain and then broadcast that block to its peers for verification and addition to their copy of the blockchain. When enough peers have verified the block, it can be deemed to be "committed", and every participant in the blockchain network will have a copy of the transaction embedded in a block somewhere in their copy of the blockchain.

According to example embodiments, the blockchain data includes embedding hashed identifiers in the blockchain transactions script_op. In this configuration, the identifiers represent coupons or offers and are visible to anyone who has access to the blockchain, but which are encrypted so that only retailers and their affiliates, and in some embodiments, certain customer devices, can decrypt and understand them.

According to example embodiments, the identifiers are a mechanism for retailers to track customer activity across various interaction channels, including channels that leverage the blockchain for payment transactions. The retailer can initiate the payment transaction, via the site 220, with a payment request (invoice) and embeds an identifier within the payment request. The customer responds to the payment request with a new transaction, and in doing so may choose to embed the identifier within the new transaction. The incentive for the customer to re-transmit the identifier is that the identifier doubles as a discount coupon or offer. When the retailer receives the payment, a further transaction is generated to refund the customer the agreed discount amount as specified by the coupon or offer in the form of a rebate. A related identifier may be embedded in the refund (rebate) transaction. The retailer maintains a database linking this identifier to known customer information. Since the identifiers are persisted permanently on the blockchain, the retailer or its affiliates can mine the data for customer analysis and segmentation at a future date. The retailer may pay a specified amount to the customer as the rebate. There may be tracking information in the OP_RETURN field of this new transaction.

With regard to tracking the redemption or acceptance of the offer/incentive identified in the incentive/coupon/cookie, when a customer device performs a purchase from a merchant site online or via an ecommerce application, by using a crypto-currency transaction, information about that user profile/device is placed into that transaction's script OP_CODE. If the information is encrypted by the merchant who placed the offer in the OP_CODE when the payment transaction template was created when the merchant 'invoiced' the consumer, then the information can be tracked by interested and privileged parties and not by others since the information remains unrevealed to third parties without access to the transaction.

Upon the receipt of the payment transaction, the merchant stores information about the consumer, such as the particular consumer purchased an item for an amount in response to a promotion. The merchant may create a second transaction, in the form of a rebate to transfer some portion of the payment's value or a new or different value back to the consumer. Since the merchant initiates this transaction, the merchant application can place an identifier in the transaction's script OP_CODE, which remains visible to others but is encrypted such that only the merchant and agencies that the merchant grants decryption keys to can understand. At a later date, the merchant or one of its trusted agents, such as a market research firm, combs the blockchain to locate all of the transactions associated with a certain promotion. The identified transactions will contain information about who paid how much for which items in response to which campaigns. This raw data may be used for behavior pattern analysis and prediction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 3 illustrates an example network element 300, which may represent or be integrated in any of the above-described components, etc.

Figure 3:
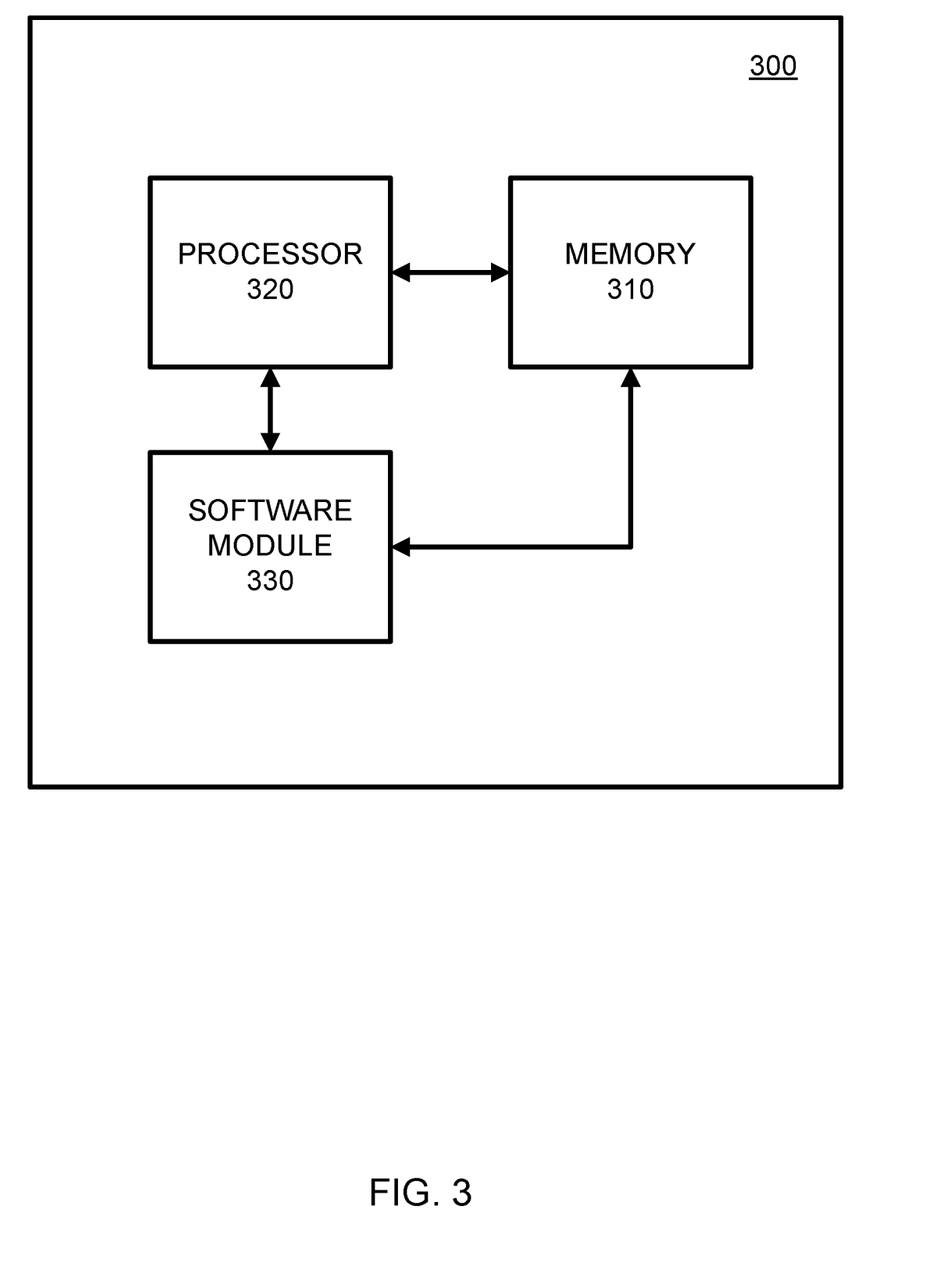
FIG. 3 illustrates a computer readable medium and non-transitory computer processing platform for performing procedures according to example embodiments of the present application.

As illustrated in FIG. 3, a memory 310 and a processor 320 may be discrete components of a network entity 300 that are used to execute an application or set of operations as described herein. The application may be coded in software in a computer language understood by the processor 320, and stored in a computer readable medium, such as, a memory 310. The computer readable medium may be a non-transitory computer readable medium that includes tangible hardware components, such as memory, that can store software. Furthermore, a software module 330 may be another discrete entity that is part of the network entity 300, and which contains software instructions that may be executed by the processor 320 to effectuate one or more of the functions described herein. In addition to the above noted components of the network entity 300, the network entity 300 may also have a transmitter and receiver pair configured to receive and transmit communication signals (not shown).

Figure 4:
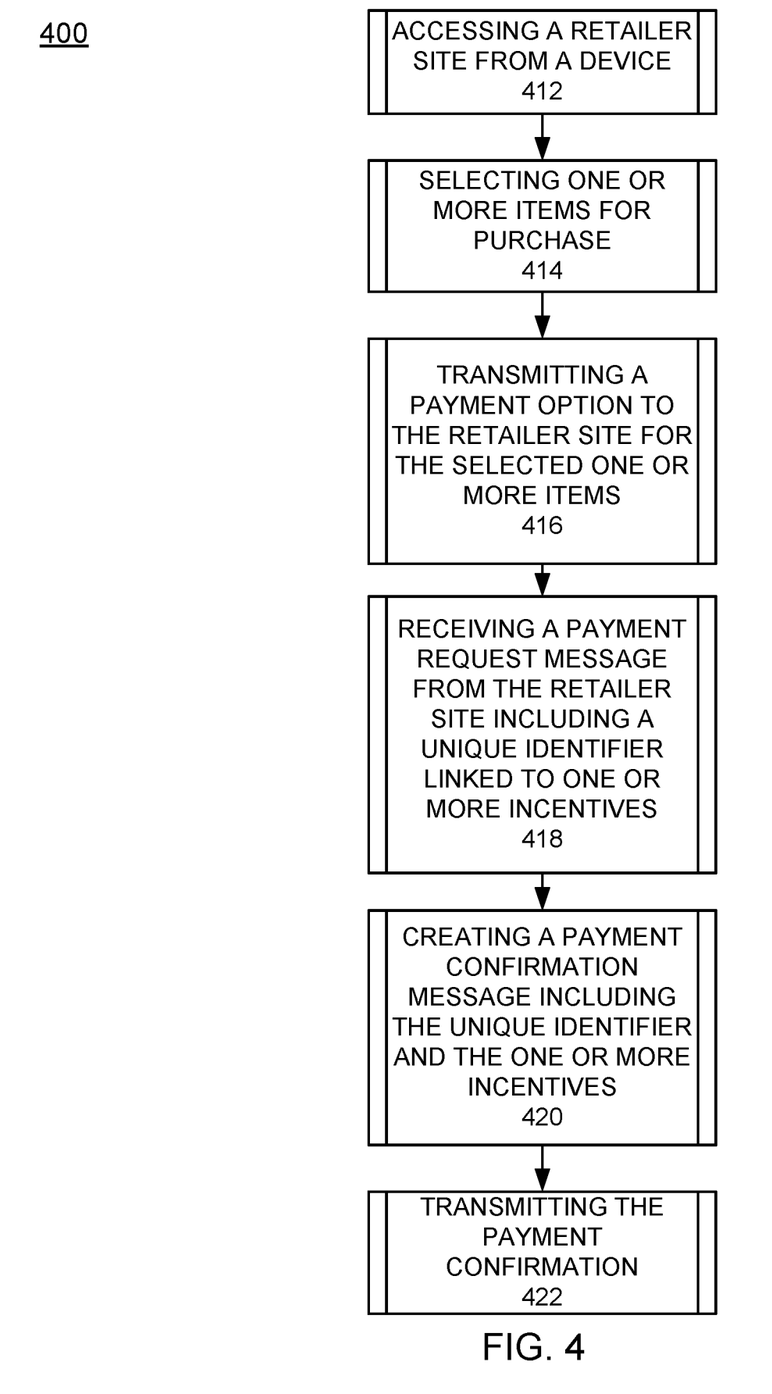
FIG. 4 illustrates a flow diagram of an example method of operation according to example embodiments.

FIG. 4 illustrates a flow diagram 400 of an example method of operation according to example embodiments. Referring to FIG. 4, the example method may include accessing a retailer site from a device 412, selecting one or more items for purchase 414, transmitting a payment option to the retailer site for the selected one or more items 416, receiving a payment request message from the retailer site including a unique identifier linked to one or more incentives 418, creating a payment confirmation message including the unique identifier and the one or more incentives 420 and transmitting the payment confirmation 422.

In a further embodiment, a method comprises at least one of: accessing a retailer site from a device, selecting one or more items for purchase, associating a digital wallet with the retailer site for the selected one or more items, receiving a payment request message from the retailer site comprising a unique identifier linked to one or more incentives, confirming, by the device, the payment request message, and based on the confirmation, performing by the retailer site, at least one of: crediting the digital wallet and debiting the digital wallet.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   selecting, via a device, one or more items from a website;
   transmitting, via the device, a message to the website selecting payment via cryptocurrency for the selected one or more items;
   receiving, via the device, a payment request message from the website which comprises a unique identifier linked to one or more incentives;
   generating, via the device, a first blockchain transaction that transfers payment for the one or more items to the website based on the cryptocurrency;
   embedding, via the device, the unique identifier and an address of a receiver of the one or more incentives into a field of an OP_RETURN script within the first blockchain transaction;
   submitting, via the device, the first blockchain transaction to a blockchain ledger; and
   receiving, via the device, a refund using a second blockchain transaction having the unique identifier in an OP_RETURN script of the second blockchain transaction in the blockchain ledger, the refund based on the one or more incentives linked to the unique identifier.

2. The method of claim 1, wherein the unique identifier comprises an identifier of one or more coupons.

3. The method of claim 1, wherein the transmitting comprises broadcasting the first blockchain transaction to a plurality of blockchain peers of the cryptocurrency.

4. The method of claim 1, wherein the embedding further comprises embedding an amount into the OP_RETURN script within the first blockchain transaction.

5. The method of claim 1, wherein the OP_RETURN script is used to mark a transaction output as invalid.

6. A device comprising:
   a processor configured to
   select one or more items from a website;

transmit a message to the website selecting payment via cryptocurrency for the selected one or more items;

receive a payment request message from the website which comprises a unique identifier linked to one or more incentives;

generate a first blockchain transaction that transfers payment for the one or more items to the website based on the cryptocurrency;

embed the unique identifier and an address of a receiver of the one or more incentives into a field of an OP_RETURN script within flail the first blockchain transaction;

submit the first blockchain transaction to a blockchain ledger; and receive a refund using a second blockchain transaction having the unique identifier in an OP_RETURN script of the second blockchain transaction in the blockchain ledger, the refund based on the one or more incentives linked to the unique identifier.

7. The apparatus of claim 6, wherein the unique identifier comprises an identifier of one or more coupons.

8. The apparatus of claim 6, wherein the processor is configured to broadcast the first blockchain transaction to a plurality of blockchain peers of the cryptocurrency.

9. The apparatus of claim 6, wherein the processor is further configured to embed an amount into the OP_RETURN script within the first blockchain transaction.

10. The apparatus of claim 6, wherein the OP_RETURN script is used to mark a transaction output as valid.

11. A non-transitory computer readable storage medium storing instructions which when executed by a processor cause the processor to perform a method comprising:

selecting one or more items from a website;

transmitting a message to the website selecting payment via cryptocurrency for the selected one or more items;

receiving a payment request message from the website which comprises a unique identifier linked to one or more incentives;

generating a first blockchain transaction that transfers payment for the one or more items to the website based on the cryptocurrency;

embedding the unique identifier and an address of a receiver of the one or more incentives into a field of an OP_RETURN script within flail the first blockchain transaction;

submitting the first blockchain transaction to a blockchain ledger; and receiving a refund using a second blockchain transaction having the unique identifier in an OP_RETURN script of the second blockchain transaction in the blockchain ledger, the refund based on the one or more incentives linked to the unique identifier.

12. The non-transitory computer readable storage medium of claim 11, wherein the unique identifier comprises an identifier of one or more coupons.

13. The non-transitory computer readable storage medium of claim 11, wherein the transmitting comprises broadcasting the first blockchain transaction to a plurality of blockchain peers of the cryptocurrency.

14. The non-transitory computer readable storage medium of claim 11, wherein the embedding further comprises embedding an amount into the OP_RETURN script within the first blockchain transaction.

* * * * *